(12) United States Patent
Chan (10) Patent No.: US 11,448,858 B2
(45) Date of Patent: Sep. 20, 2022

(54) ULTRACOMPACT WIDE FIELD OF VIEW LENS ASSEMBLY

(71) Applicant: Meta Platforms Technologies, LLC, Menlo Park, CA (US)

(72) Inventor: Ning Yueng Chan, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/513,606

(22) Filed: Jul. 16, 2019

(65) Prior Publication Data
US 2020/0049956 A1    Feb. 13, 2020

Related U.S. Application Data

(60) Provisional application No. 62/716,205, filed on Aug. 8, 2018.

(51) Int. Cl.
| | | |
|---|---|---|
| *G02B 13/00* | (2006.01) | |
| *G02B 9/60* | (2006.01) | |
| *G02B 27/01* | (2006.01) | |

(52) U.S. Cl.
CPC ........... *G02B 13/0045* (2013.01); *G02B 9/60* (2013.01); *G02B 27/0172* (2013.01); *G02B 2027/0138* (2013.01)

(58) Field of Classification Search
CPC .. G02B 13/0045; G02B 9/60; G02B 27/0172; G02B 2027/0138; G02B 13/06; G02B 13/003; G02B 13/0035; G02B 13/004
See application file for complete search history.

(56) References Cited

U.S. PATENT DOCUMENTS

| | | |
|---|---|---|
| 2013/0265650 A1 | 10/2013 | Chen et al. |
| 2014/0313596 A1 | 10/2014 | Hashimoto |
| 2015/0286035 A1 | 10/2015 | Lin et al. |
| 2017/0023770 A1* | 1/2017 | Teraoka ............. G02B 13/0045 |
| 2017/0307855 A1 | 10/2017 | Lu |
| 2017/0336604 A1 | 11/2017 | Hsu et al. |
| 2018/0017764 A1 | 1/2018 | Kang et al. |
| 2019/0271832 A1* | 9/2019 | Kuo ................... G02B 13/0045 |

FOREIGN PATENT DOCUMENTS

| | | | |
|---|---|---|---|
| CN | 104749744 A | 7/2015 | |
| CN | 105759400 A | 7/2016 | |
| EP | 2065744 A1 * | 6/2009 | ........... G02B 13/003 |

OTHER PUBLICATIONS

International Searching Authority, Patent Cooperation Treaty, European Application No. PCT/US2019/045770, Notification dated Oct. 29, 2019, 6 pages.

(Continued)

*Primary Examiner* — Wen Huang
(74) *Attorney, Agent, or Firm* — Freestone Intellectual Property Law PLLC; Aaron J. Visbeek (57) ABSTRACT

A camera includes an image sensor and a lens assembly. The image sensor includes a pixel array. The pixel array includes imaging pixels arranged in rows and columns. The lens assembly is configured to focus imaging light from a wide field of view onto the image sensor. The lens assembly includes a plurality of lens elements. The lens elements are arranged from widest to narrowest.

18 Claims, 7 Drawing Sheets

(56) References Cited

OTHER PUBLICATIONS

Patent Cooperation Treaty, International Search Report, European Application No. PCT/US2019/045770, Notification dated Oct. 29, 2019, 3 pages.
International Preliminary Report on Patentability for International Application No. PCT/US2019/045770, dated Feb. 18, 2021, 8 Pages.
Office Action dated Dec. 3, 2022 for Chinese Application No. 201980040311.1, filed Aug. 8, 2019, 15 pages.

\* cited by examiner

FIG. 4B $$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

699 where:
- $z$   is the sag of the surface parallel to the z-axis
- $c$   is the curvature at the pole of the surface (CUY)
- $k$   is the conic constant (K) and

FIG. 6

ULTRACOMPACT WIDE FIELD OF VIEW LENS ASSEMBLY

CROSS REFERENCE TO RELATED APPLICATIONS

This application claims priority to U.S. provisional Application No. 62/726,205, entitled "Ultracompact Wide Field of View Lens Assembly" filed Aug. 8, 2018, which is hereby incorporated by reference.

TECHNICAL FIELD

This disclosure relates generally to optics, and in particular to wide field of view imaging.

BACKGROUND INFORMATION

There are a variety of application where wide Field of View (FOV) imaging is utilized. Example contexts include, mobile device cameras, action cameras, head mounted displays, and automotive imaging devices. In some contexts, light-weight and ultracompact cameras that provide high quality imaging are especially useful.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an ultracompact wide field of view lens assembly and camera are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments of cameras and lens assemblies of this disclosure provide a wide Field of View (FOV) for imaging in an ultracompact form factor. The disclosed embodiments may be advantageously used in a variety of contexts including a Head Mounted Display (HMD) because of the ultracompact and light-weight features, among other advantages. The lens assemblies may be used for body tracking and environmental tracking in Virtual Reality, Augmented Reality, and/or Mixed Reality contexts, for example. In an embodiment of the disclosure, a lens assembly features aspherical refractive lens elements that deliver a FOV of approximately 150 degrees while having a total track length (TTL) of less than 4 mm. In some embodiments, the TTL of the lens assembly may be less than an x and/or y dimension of a pixel array that receives imaging light from the lens assembly.

Conventionally, wide FOV lens assemblies include a front/first lens element that is wide to provide the large field of view, yet in an embodiment of the disclosure, the front lens element is the narrowest lens element in the lens assembly. In some embodiments, the front lens element is the narrowest and the lens elements get progressively wider (e.g. having a larger radius) as they get closer to an image sensor. The aperture stop of the disclosed lens assembly may be located at the front of the lens assembly (near the front lens element) whereas conventional lens assemblies have the aperture stop in the middle of the lens assembly. Designing the aperture stop near the front of the lens assembly assist in avoiding distortion when imaging objects that are in motion.

In embodiments of the disclosure, each refractive lens element (including the front lens element) of a lens assembly is plastic. In conventional wide FOV lens assemblies, the front refractive lens element is glass. However, the design of the disclosed lens assembly allows for a plastic front refractive lens element that reduces the weight of the lens assembly and may improve the cost and/or ease of manufacturing.

These and other embodiments are described in detail below with respect to FIGS. 1-6.

Figure 1:
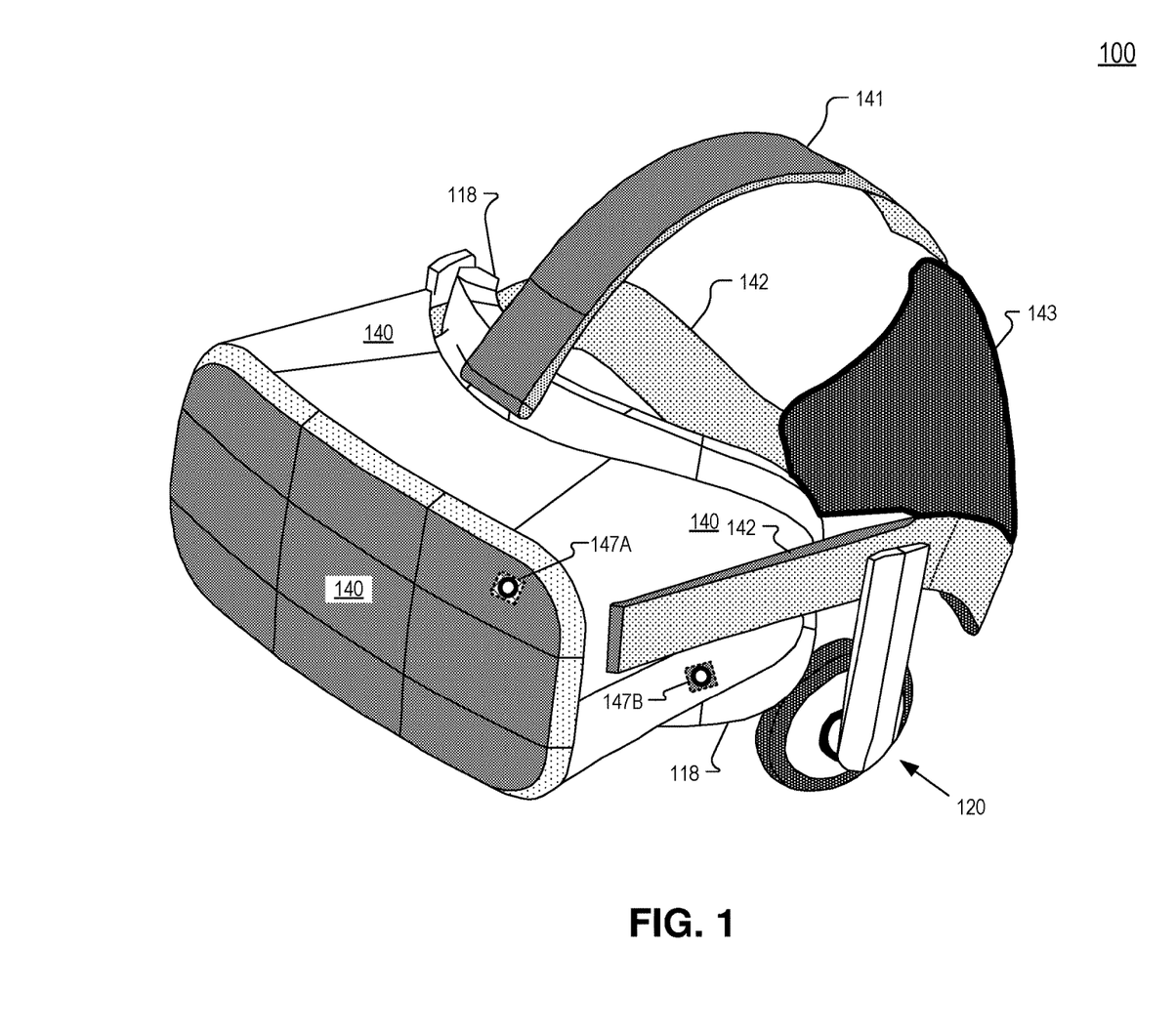
FIG. 1 illustrates an example head mounted display (HMD) that may include a lens assembly or a camera, in accordance with an embodiment of the disclosure.

FIG. 1 illustrates an example head mounted display (HMD) 100 that may include a lens assembly or a camera, in accordance with an embodiment of the disclosure. The illustrated example HMD 100 includes a top structure 141, a rear securing structure 143, and a side structure 142 attached with a viewing structure 140. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display for directing display light to a wearer of HMD 100. The display may include an LCD, an organic light emitting diode (OLED) display, micro-LED display, quantum dot display, pico-projector, or liquid crystal on silicon (LCOS) display for directing image light to a wearer of HMD 100. In the illustrated embodiment, cameras 147A and 147B are attached with and/or disposed on viewing structure 140. Additional cameras (not illustrated) may be included in different positions of HMD 100. Cameras 147A and 147B are illustrated as outward facing and positioned to capture images of an external environment of the HMD. The cameras may be positioned for body-tracking imaging purposes, in some contexts.

Figure 2:
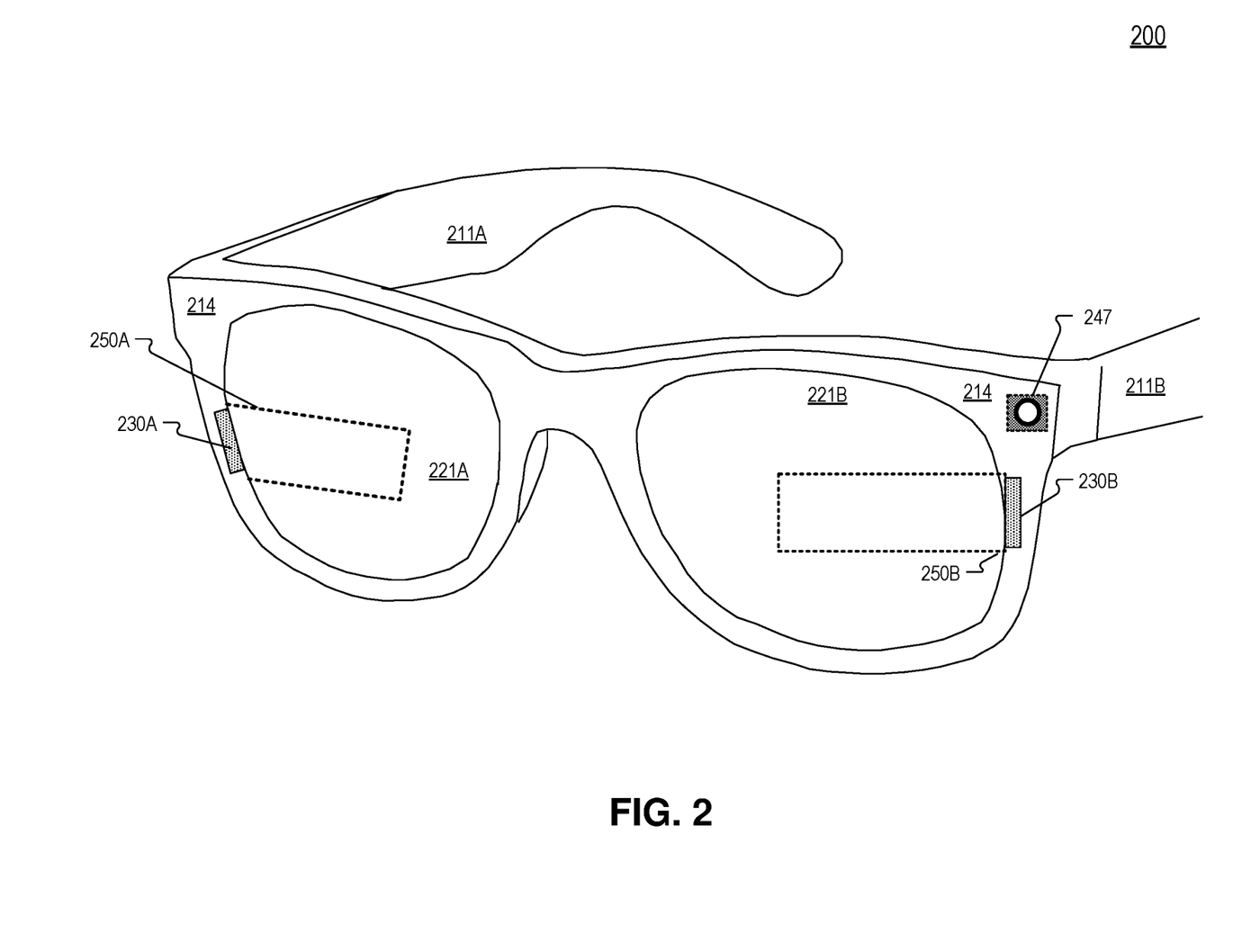
FIG. 2 illustrates an example HMD that may include a lens assembly or camera, in accordance with an embodiment of the disclosure.

FIG. 2 illustrates an example HMD 200 that may include a lens assembly or camera, in accordance with an embodiment of the disclosure. HMD 200 includes frame 214 coupled to arms 211A and 211B. Lenses 221A and 221B are mounted to frame 214. Lenses 221 may be prescription lenses matched to a particular wearer of HMD or non-prescription lenses. The illustrated HMD 200 is configured to be worn on or about a head of a user of the HMD.

In FIG. 2, each lens 221 includes a waveguide 250 to direct display light generated by a display 230 to an eyebox area for viewing by a wearer of HMD 200. Display 230 may include an LCD, an organic light emitting diode (OLED) display, micro-LED display, quantum dot display, pico-projector, or liquid crystal on silicon (LCOS) display for directing display light to a wearer of HMD 200.

The frame 214 and arms 211 of the HMD 200 may include supporting hardware of HMD 200. HMD 200 may include any of processing logic, wired and/or wireless data interface for sending and receiving data, graphic processors, and one or more memories for storing data and computer-executable instructions. In one embodiment, HMD 200 may be configured to receive wired power. In one embodiment, HMD 200 is configured to be powered by one or more batteries. In one embodiment, HMD 200 may be configured to receive wired data including video data via a wired communication channel. In one embodiment, HMD 200 is configured to receive wireless data including video data via a wireless communication channel.

Lenses 221 may appear transparent to a user to facilitate augmented reality or mixed reality where a user can view scene light from the environment around her while also receiving image light directed to her eye(s) by waveguide(s) 250. Consequently, lenses 221 may be considered (or include) an optical combiner. In some embodiments, display light is only directed into one eye of the wearer of HMD 200. In an embodiment, both displays 230A and 230B are included to direct image light into waveguides 250A and 250B, respectively. An example camera 247 is included in frame 214 of HMD 200. Camera 247 may be mounted in other positions of HMD 200.

Figure 3:
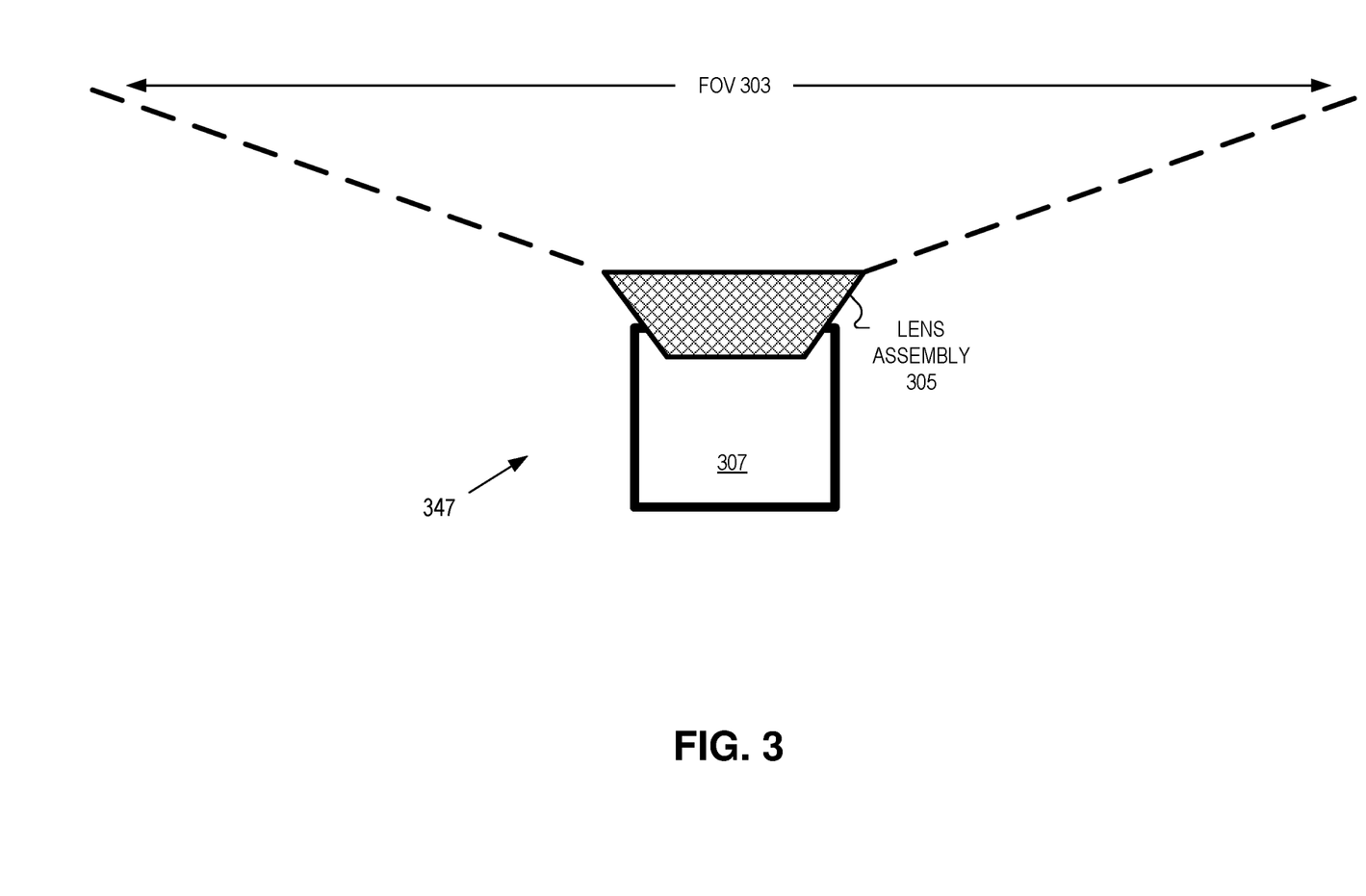
FIG. 3 illustrates an example wide field of view camera including a camera body and a lens assembly, in accordance with an embodiment of the disclosure.

Cameras 147A, 147B, and 247 may include features of camera 347 illustrated in FIG. 3, in accordance with embodiments of this disclosure. In FIG. 3, camera 347 includes a body 307 and a lens assembly 305. Camera body 307 may hold an image sensor and lens assembly 305 may focus image light from FOV 303 onto the image sensor. In some embodiments, the FOV 303 is greater than 130 degrees. In one embodiment, the FOV 303 is approximately 150 degrees.

Figure 4A:
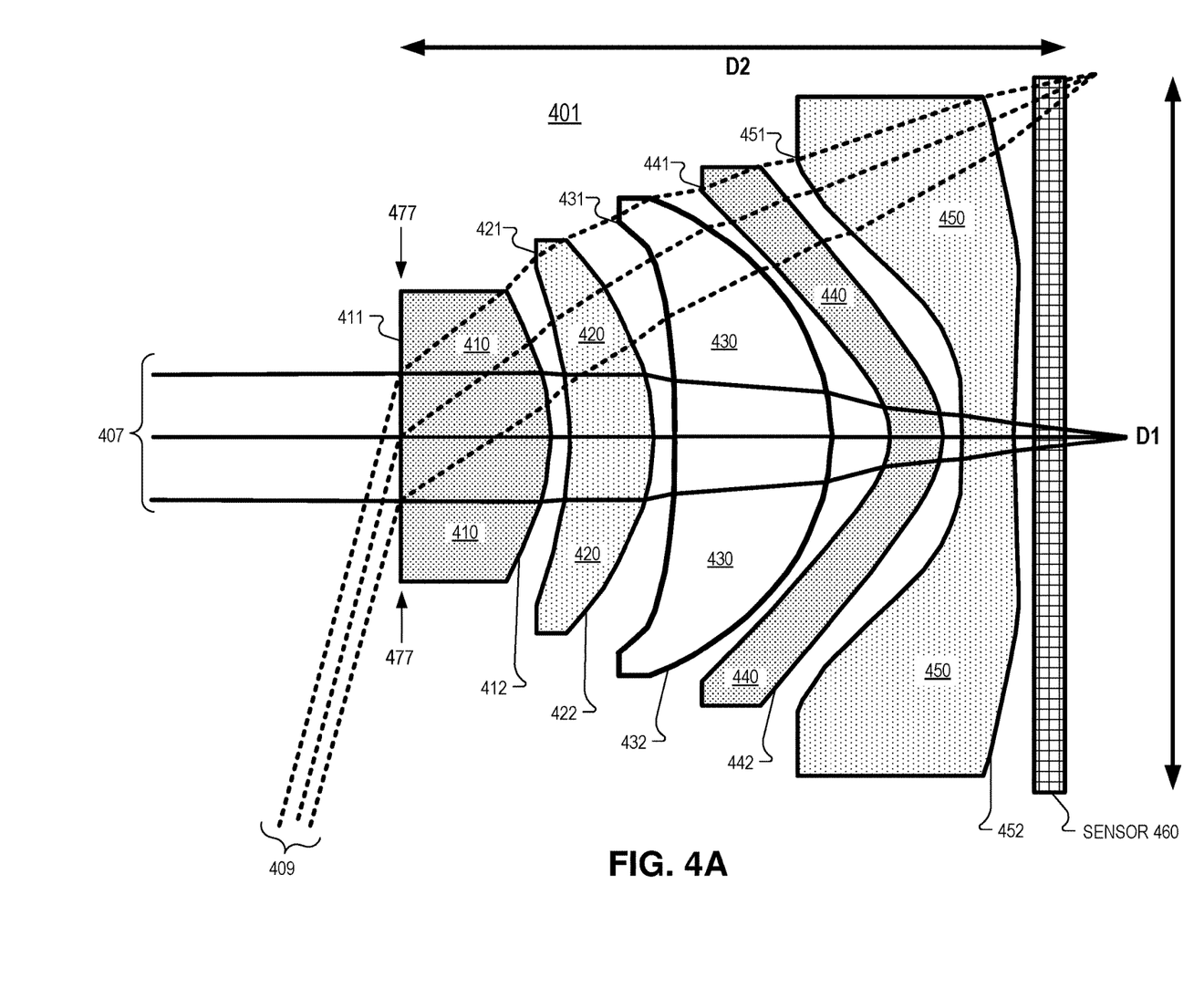
FIGS. 4A and 4B illustrate a cross section of an example lens assembly and an image sensor 4 that may be utilized in cameras, in accordance with an embodiment of the disclosure.
Figure 4B:
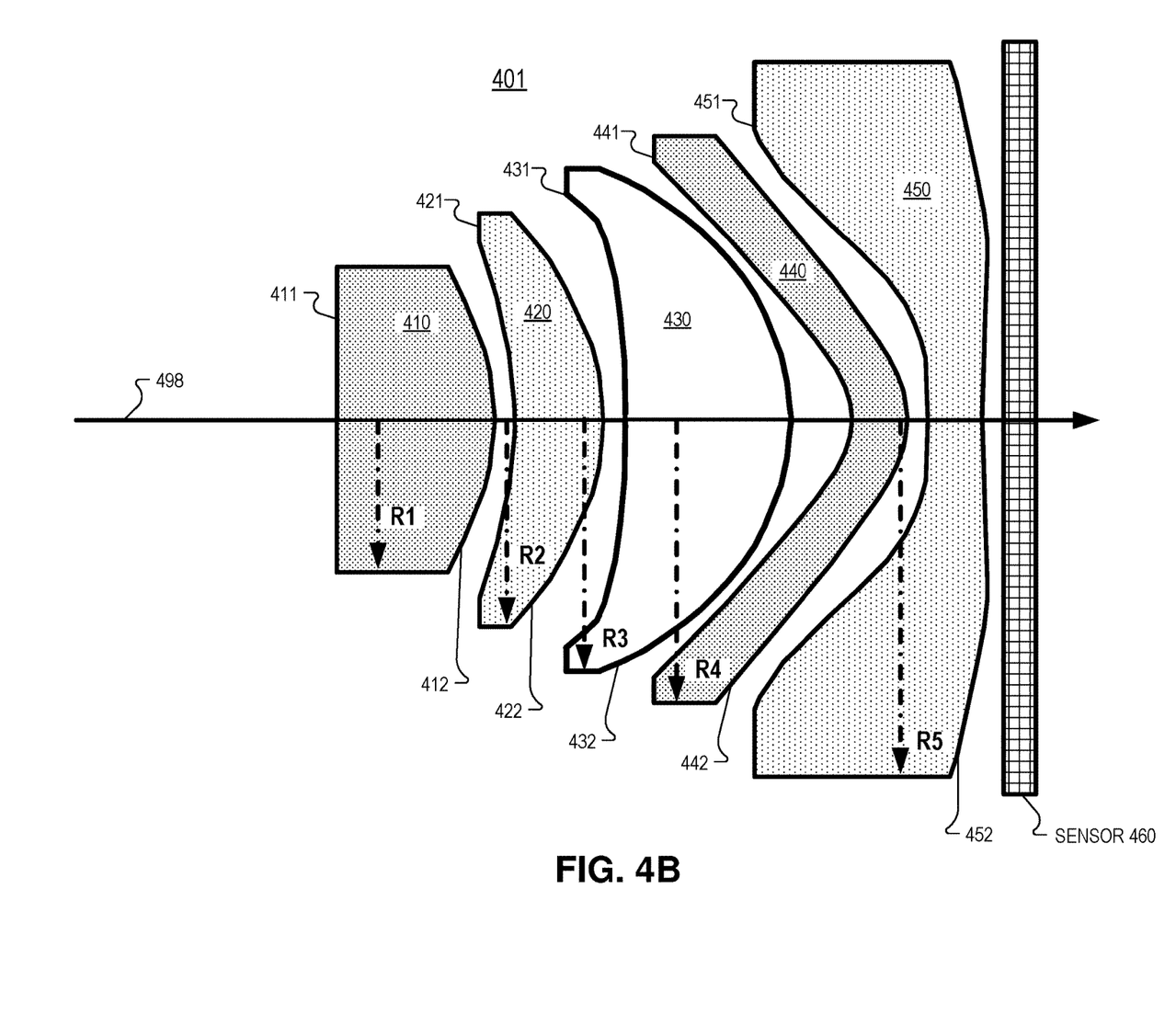

FIGS. 4A and 4B illustrate a cross section of an example lens assembly 401 and an image sensor 460 that may be utilized in cameras 147A, 147B, 247, and 347, in accordance with an embodiment of the disclosure. Lens assembly 401 focuses image light onto image sensor 460.

The lens assembly of FIG. 4A includes first lens element 410, second lens element 420, third lens element 430, fourth lens element 440, and fifth lens element 450. Lens element 410 includes lens surface 411 and lens surface 412. Lens element 410 is the front lens element in lens assembly 401. Lens element 420 includes lens surface 421 and lens surface 422. Lens element 430 includes lens surface 431 and lens surface 432. Lens element 440 includes lens surface 441 and lens surface 442. Lens element 450 includes lens surface 451 and lens surface 452. Lens element 450 is the rear lens element in lens assembly 401. In some embodiments, each surface 411, 412, 421, 422, 431, 432, 441, 442, 451, and 452 is aspherical. Notably, lens surface 411 may be aspherical even though the illustrated surface 411 appears flat (planar) in the example illustration. The terms of the aspherical functions that describe the lens surfaces may be of a very high order in order to provide a large FOV. The form of the aspherical surfaces 411, 412, 421, 422, 431, 432, 441, 442, 451, and 452 may be described by equation 699 in FIG. 6 where A, B, C, D, E, F, G, H, and J are the coefficients of equation 699. In one embodiment, the form of aspherical surface 452 is described by a sixteenth order polynomial equation, for example. In one embodiment, the form of aspherical surface 432 is also described by a sixteenth order polynomial equation.

In some embodiments, the FOV is larger than 130 degrees. In some embodiments, the FOV is approximately 150 degrees. In an embodiment, the focal length of lens assembly 401 is approximately 1.62 mm and the F number is approximately f/2.8.

Front imaging light rays 407 illustrate an example ray trace through lens assembly 401 for imaging light encountering lens assembly 401 from a middle of a FOV of the lens assembly 401. Oblique imaging light rays 409 illustrate an example ray trace through lens assembly 401 for imaging light encountering lens assembly 401 from the boundary of a FOV of the lens assembly 401.

In FIG. 4A, the lens elements 410, 420, 430, 440, and 450 are arranged from widest (lens element 450) to narrowest (lens element 410). Referring to FIG. 4B, each of lens elements 410, 420, 430, 440, and 450 may be rotationally symmetric around a central optical axis 498 of the lens assembly 401. In those embodiments, lens element 410 has a radius R1, lens element 420 has a radius R2, lens element 430 has a radius R3, lens element 440 has a radius R4, and lens element 450 has a radius R5. Radius R5 is illustrated as larger than radius R4, radius R4 is larger than radius R3, radius R3 is larger than radius R2, and radius R2 is larger than radius R1. Thus, the lens elements are arranged from largest radius to smallest radius where the lens elements get progressively wider as they get closer to image sensor 460. Each lens element 410, 420, 430, 440, and 450 is made of a refractive material. Each lens element in assembly 401 may be plastic in some embodiments. In some embodiments, the plastic included in the lens elements are suitable for fabricating the lens elements using an injection molding process.

Figure 5:
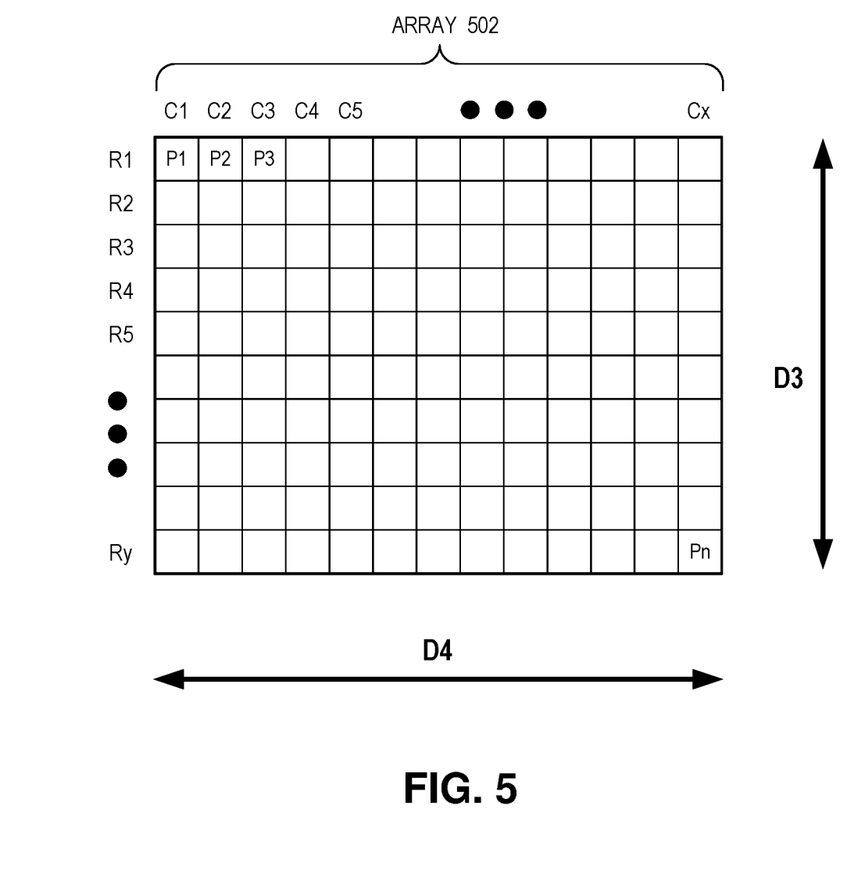
FIG. 5 illustrates a plan view of example pixel array arranged in rows and columns, in accordance with embodiments of the disclosure.
Figure 6:
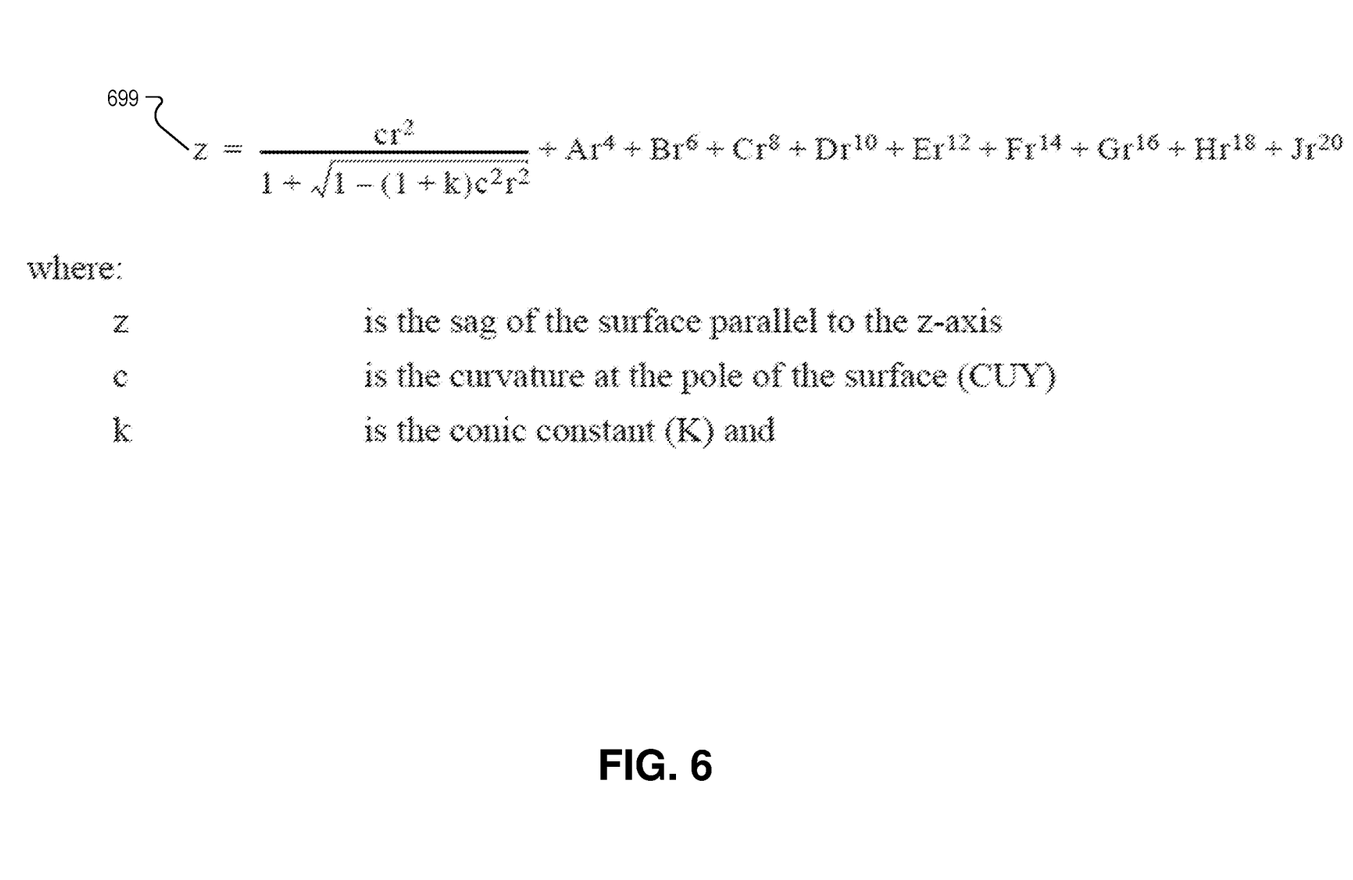
FIG. 6 illustrates an example equation that may be used to describe aspherical surfaces of a lens assembly, in accordance with an embodiment of the disclosure.

Referring again to FIG. 4A, the TTL of lens assembly 401 is shown as dimension D2 and a dimension of a length or width of image sensor 460 is shown as dimension D1. FIG. 5 illustrates a plan view of example pixel array 502 arranged in rows and columns, in accordance with embodiments of the disclosure. The example pixel array 502 includes imaging pixels P1-$P_n$ arranged in rows R1-$R_y$ and columns C1-$C_x$. Pixel array 502 may be included an image sensor such as a complementary metal-oxide-semiconductor (CMOS) image sensor. Image sensor 460 may be a CMOS image sensor. The imaging pixels in a CMOS image sensor may include pinned photodiodes having a silicon semiconductor for measuring imaging signals generated by incident imaging light. Readout circuitry of the image sensor (not illustrated) may measure an imaging signal of each imaging pixel that is generated over an integration period. The readout circuitry may readout pixel array 502 in a global shutter readout or rolling shutter readout to form images from the incident imaging light. The readout may provide the imaging signals from each pixel to a digital signal processor (DSP) included in the image sensor, in some embodiments. The physical dimension of pixel array 502 is D3 in the y dimension (rows) and D4 in the x dimension (columns). Pixel array 502 may have 4200 columns and 2800 rows in some embodiments. Of course, other resolutions of pixel array 502 may be utilized. In one embodiment, the numbers of rows and columns of pixel array 502 are the same and dimension D3 and D4 are the same.

Referring again to FIG. 4A, dimension D1 of sensor 460 may represent the x dimension of columns (D4) and/or the y dimension of rows (D3) of the pixel array 502. In some embodiments, dimension D2 is less than dimension D1. In other words, a total track length (TTL) of the lens assembly 401 is less than an x dimension of the columns or a y dimension of the rows of the pixel array included in image sensor 460. Dimension D2 may be less than 4 mm, whereas conventional wide FOV lens assembly have a TTL of 8 mm or more. In one embodiment, dimension D2 is 3.33 mm and dimension D1 is 3.52 mm.

In FIG. 4A, the aperture stop 477 of lens assembly 401 is illustrated at the front of the lens assembly. In particular aperture stop 477 is approximately co-located with first lensing surface 411 of front optical element 410. Designing the aperture stop 477 near the front of the lens assembly 401 assist in avoiding distortion when imaging objects that are in motion. In contrast, conventional lens assemblies have the aperture stop in the middle of the lens assembly, which may lead to a shifting of the image (distortion) on the image sensor as an object is in motion.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera comprising:
   an image sensor having a pixel array, wherein the pixel array includes imaging pixels arranged in rows and columns; and a lens assembly configured to focus imaging light from a wide field of view (FOV) onto the image sensor, the lens assembly substantially consisting of a plurality of lens elements including five or less lens elements, wherein the lens elements are arranged from widest to narrowest, a rear lens element in the plurality of lens elements being the widest of the lens elements and positioned closest to the image sensor, and a front lens element in the plurality of lens elements being the narrowest lens element positioned farthest from the image sensor, wherein the rear lens element and a lens element that is next to the rear lens element each have a lensing surface that is concave aspherical on an object-side along a central optical axis of the lens assembly and wherein the wide FOV of the lens assembly is greater than 130 degrees.

2. The camera of claim 1, wherein a total track length (TTL) of the lens assembly is less than an x dimension of the columns or a y dimension of the rows of the pixel array.

3. The camera of claim 1, wherein a total track length (TTL) of the lens assembly is less than 4 mm.

4. The camera of claim 1, wherein each lens element in the plurality of lens elements includes an aspherical lensing surface.

5. The camera of claim 1, wherein each lens elements in the plurality of lens elements is rotationally symmetric around the central optical axis, and wherein the lens elements are arranged from largest radius to smallest radius, the rear lens element having the largest radius and the front lens element having the smallest radius.

6. The camera of claim 1, wherein a refractive material of the front lens element consists of plastic.

7. The camera of claim 1, wherein each of the lens elements in the plurality of lens elements includes a plastic refractive material.

8. The camera of claim 1, wherein the image sensor includes a complementary metal-oxide-semiconductor (CMOS) image sensor.

9. The camera of claim 1, wherein the front lens element includes a first lensing surface and a second lensing surface, wherein the first lensing surface is aspherical and the second lensing surface is aspherical, the second lensing surface disposed between the first lensing surface and the image sensor.

10. The camera of claim 9, wherein an aperture stop of the lens assembly is approximately co-located with the first lensing surface.

11. The camera of claim 1, wherein the lens assembly further includes a second lens element and a third lens element disposed between the front lens element and a fourth lens element, and wherein the fourth lens element is the lens element that is next to the rear lens element and is disposed between the third lens element and the rear lens element.

12. The camera of claim 11, wherein the fourth lens element and the rear lens element are configured to correct for field aberration.

13. A Head Mounted Display (HMD) comprising:
a display configured to provide display light to an eye of a user of the HMD; and
a camera including:
an image sensor having a pixel array, wherein the pixel array includes imaging pixels arranged in rows and columns; and
a lens assembly configured to focus imaging light from a wide field of view (FOV) onto the image sensor, the lens assembly substantially consisting of a plurality of lens elements including five or less lens elements, wherein the lens elements are arranged from widest to narrowest, a rear lens element in the plurality of lens elements being the widest of the lens elements and positioned closest to the image sensor, and a front lens element in the plurality of lens elements being the narrowest lens element positioned farthest from the image sensor and wherein the rear lens element and a lens element next to the rear lens element each have a lensing surface on an object-side that is concave aspherical along a central optical axis of the lens assembly and wherein the wide FOV of the lens assembly is greater than 130 degrees.

14. The HMD of claim 13, wherein the camera is outward facing and positioned to capture images of an external environment of the HMD.

15. The HMD of claim 13, wherein a total track length (TTL) of the lens assembly is less than an x dimension of the columns or a y dimension of the rows of the pixel array.

16. The HMD of claim 13, wherein each lens element in the plurality of lens elements includes an aspherical lensing surface.

17. The HMD of claim 13, wherein each lens elements in the plurality of lens elements is rotationally symmetric around the central optical axis, and wherein the lens elements are arranged from largest radius to smallest radius, the rear lens element having the largest radius and the front lens element having the smallest radius.

18. The HMD of claim 13, wherein an aperture stop of the lens assembly is approximately collocated with a first lensing surface of the front lens element.

* * * * *